US005812318A

United States Patent [19]
Babbitt et al.

[11] Patent Number: 5,812,318
[45] Date of Patent: Sep. 22, 1998

[54] APPARATUS AND METHODS FOR ROUTING OF OPTICAL BEAMS VIA TIME-DOMAIN SPATIAL-SPECTRAL FILTERING

[75] Inventors: William Randall Babbitt, Bellevue, Wash.; Thomas W. Mossberg, Eugene, Oreg.

[73] Assignee: University of Washington, Seattle, Wash.

[21] Appl. No.: 897,814

[22] Filed: Jul. 21, 1997

Related U.S. Application Data

[63] Continuation of Ser. No. 403,376, Mar. 13, 1995, abandoned.

[51] Int. Cl.$^6$ .............................. G02B 27/46; G11C 13/00
[52] U.S. Cl. ............................ 359/559; 359/569; 359/10; 359/11; 359/566; 365/119
[58] Field of Search ................................. 359/10, 11, 22, 359/28, 29, 558, 559, 560, 561, 569, 130; 385/37; 365/119

[56] References Cited

U.S. PATENT DOCUMENTS

| | | | |
|---|---|---|---|
| 3,568,167 | 3/1971 | Carson | 340/173 |
| 3,896,420 | 7/1975 | Szabo | 340/173 CC |
| 3,922,061 | 11/1975 | Glass et al. | 359/22 |
| 4,101,976 | 7/1978 | Castro et al. | 365/119 |
| 4,158,890 | 6/1979 | Burland | 365/119 |
| 4,329,059 | 5/1982 | Pond et al. | 359/558 |
| 4,387,955 | 6/1983 | Ludman et al. | 359/15 |
| 4,459,682 | 7/1984 | Mossberg | 365/119 |
| 4,533,211 | 8/1985 | Bjorklund | 359/559 |
| 4,670,854 | 6/1987 | Mossberg et al. | 365/822 |
| 4,941,733 | 7/1990 | Leib | 359/561 |
| 5,239,548 | 8/1993 | Babbitt et al. | 372/26 |
| 5,276,637 | 1/1994 | Mossberg | 365/106 |
| 5,315,423 | 5/1994 | Hong | 359/15 |
| 5,337,382 | 8/1994 | Mizrahi | 385/37 |

OTHER PUBLICATIONS

Babbitt et al., "Convolution, Correlation, and Storage of Optical Data in Inhomogeneously Broadened Absorbing Materials," *Proc. SPIE* 639:240–247 (1986).

Babbitt et al., "Mixed Binary Multiplication of Optical Signals by Convolution in an Inhomogeneously Broadened Absorber," *Appl. Optics* 25:962–965 (1986).
Bai et al., "Real–Time Optical Waveform Convolver/Cross Correlator," *Appl. Phys. Lett.* 45:714–716 (1984).
Brady et al., "Volume Holographic Pulse Shaping," *Opt. Lett.* 17:610–612 (1992).
Carlson et al., "Temporally Programmed Free–Induction Decay," *Phys. Rev.* 30:1572–1574 (1984).
Carter et al., "Photon–Gated Spectral Hole Burning By Donor–Acceptor Electron Transfer," *Opt. Lett.* 12:370–372 (1987).
Weiner, "Femtosecond Spectral Holography," *IEEE J. Quantum Electron.* 28:2251–2261 (1992).
Winnacker et al., "Photon–Gated Hole Burning: A New Mechanism Using Two–Step Photoionization," *Opt. Lett.* 10:350–352 (1985).

(List continued on next page.)

*Primary Examiner*—Paul M. Dzierzynski
*Assistant Examiner*—Audrey Chang
*Attorney, Agent, or Firm*—Klarquist Sparkman Campbell Leigh & Whinston, LLP

[57] ABSTRACT

Apparatus and methods are disclosed for spatially routing an optical pulse (data pulse) of an electromagnetic radiation and containing a specific address temporal profile and possibly additional data. Routing generally involves a unit of active material that is programmed using one or more input beams or pulses of the electromagnetic radiation providing address (i.e., waveform-discriminating) and directional (i.e., pulse routing) information to the active material. During programming, a spatial-spectral grating is created by optical interference on or in the active material of the input pulses encoding the address and directional information pertinent to the data pulse. Whenever a data pulse, encoding a temporal profile that is substantially similar to the temporal profile of the address, interacts with the grating in or on the active material, the active material produces an output pulse that propagates in a direction, relative to the material, corresponding to the directional information provided during programming.

13 Claims, 5 Drawing Sheets

OTHER PUBLICATIONS

Dagani, "Photorefractive Polymers Poised to Play Key Role in Optical Technologies," *Chem. & Eng. News* pp. 28–32 (Feb. 20, 1995).

Kachru, "Stimulated Echo Optical Memory," Proceedings of The 3–D Memory Workshop, Snowbird, Utah (1990).

Macfarlane, "Photon–Echo Measurements on the Trivalent Thulium Ion," *Opt. Lett. 18*:1958–1960 (1993).

Macfarlane, "Spectral Hole Burning in the Trivalent Thulium Ion," *Opt. Lett. 18*:829–831 (1993).

Mazurenko, "Holography of Wave Packets," *Appl. Phys. B 50*:101–114 (1990).

Mazurenko, "Interference of Spectrally Dispersed Light," *Opt. Spectrosc.* (*USSR*) *56*:357 (1984).

Mazurenko, "Reconstruction of a Nonstationary Wave Field by Holography in a 3–D Medium," *Opt. Spectrosc.* (*USSR*) *57*:569–571 (1984).

Mazurenko, "Reconstruction of a Time–Varying Wavefront by Multibeam Interference," *Sov. Tech. Phys. Lett. 10*:228–229 (1984).

Mossberg, "Time–Domain Frequency–Selective Optical Data Storage," *Opt. Lett. 7*:77–79 (1982).

Service, "Nonlinear Competition Heats Up," *Science 267*:1918–1921 (1995).

5,812,318

APPARATUS AND METHODS FOR ROUTING OF OPTICAL BEAMS VIA TIME-DOMAIN SPATIAL-SPECTRAL FILTERING

This application is a continuation, of application Ser. No. 08/403,376, filed on Mar. 13, 1995, now abandoned.

ACKNOWLEDGMENT

This invention was developed using resources provided by grants F49620-92-J-0384 and F49620-93-I0513 from the Air Force Office of Scientific Research. Thus, the federal government has certain rights in this invention.

FIELD OF THE INVENTION

This invention relates to apparatus and methods for spatially directing optical beams containing temporally structured data.

BACKGROUND OF THE INVENTION

There is an ongoing need for further improvements in the rates at which massive amounts of data can be exchanged between, for example, networked computers and other data-handling devices. With the continuing increase in the number of nodes requiring data interchange capability, and in the growth in complexity of data required by each node, data transmission and processing are being pushed to their technological limits. It is thus vital to identify new technological approaches to network implementation so that further increases in the volume and efficiency of data transmission can be realized.

Transmission and processing of data by optical means has shown promise in possibly achieving technological breakthroughs in the speed and efficiency of data handling. Data transmission by optical fibers is now common. The use of spatial-spectral holographic devices may open the door to optical networks operating at substantially higher performance levels than can be realized using conventional technology. One particular arena in which optical data-handling devices offer promise is in the continuous transmission and processing of large blocks of data (greater than 10 kbytes) at very high rates (10 gigabits per second or higher).

In addition to the foregoing, substantial progress has been realized in optical memories. For example, in our work with time-domain, frequency-selective, optical memories, we found that materials exhibiting intrinsic frequency selectivity can be employed to record both the temporal and the spatial characteristics of incident optical beams. Mossberg, "Time-domain Frequency-selective Optical Data Storage," *Optics Lett.* 7:77–79 (1982). Our subsequent work demonstrated that the same basic interaction could be employed to perform processing of distinct temporally structured optical beams by convolution and cross correlation. Bai et al., "Real-time Optical Waveform Convolver/Cross Correlator," *Appl. Phys. Lett.* 45:714–716 (1984); and Babbitt et al., "Mixed Binary Multiplication of Optical Signals by Convolution in an Inhomogeneously Broadened Absorber," *Appl. Optics* 25: 962–965 (1986). In this work, we found that the underlying mechanisms were consistent with operation at ultra-high bandwidths while simultaneously providing relatively large time-bandwidth products. (Because the foregoing references are pertinent to an understanding of the present invention, the references are expressly incorporated herein by reference.)

A body of related experimental and theoretical work has also appeared extending these concepts in a variety of directions. For example, references disclosing data storage and processing with intrinsic frequency selectivity (i.e., using frequency-selective materials) include: Carlson et al., "Temporally Programmed Free-induction Decay," *Phys. Rev. A* 30:1572–1574 (1984); Babbitt et al., "Convolution, Correlation, and Storage of Optical Data in Inhomogeneously Broadened Absorbing Materials," *Proceedings of SPIE—The International Society For Optical Engineering*, Vol. 639 *Advances in Optical Information Processinq II*, pp. 240–247 (1986); Szabo, U.S. Pat. No. 3,896,420 (Jul. 22, 1975); Castro et al., U.S. Pat. No. 4,101,976 (Jul. 18, 1978); Burland, U.S. Pat. No. 4,158,890 (Jun. 19, 1979); Mossberg, U.S. Pat. No. 4,459,682 (Jul. 10, 1984); Mossberg et al., U.S. Pat. No. 4,670,854 (Jun. 2, 1987); Babbitt et al., U.S. Pat. No. 5,239,548 (Aug. 24, 1993); and Mossberg, U.S. Pat. No. 5,276,637 (Jan. 4, 1994). (Because these references are pertinent to an understanding of the present invention, the references are expressly incorporated herein by reference.)

Analogous optical functions have also been realized using frequency-selective spatial gratings in materials that possess no intrinsic frequency selectivity. Mazurenko, "Interference of Spectrally Dispersed Light," *Opt. Spectrosc. (USSR)* 56:357 (1984); Mazurenko, "Reconstruction of a Nonstationary Wave Field by Holography in a 3-D Medium," *Opt. Sipectrosc.* (USSR) 57:343–344 (1984); Mazurenko, "Reconstruction of a Time-Varying Wavefront by Multibeam Interference," *Sov. Tech. Phys. Lett.* 10:228–229 (1984); Mazurenko, "Holography of Wave Packets," *Appl. Phys. B* 50:101–114 (1990); and Brady et al., "Volume Holographic Pulse Shaping," *Optics Lett.* 17:610–612 (1992). (Because these references are pertinent to an understanding of the present invention, they are expressly incorporated herein by reference.)

Optical processes responsible for storage and/or processing of temporal waveform data frequently can also lead to the storage of spatial waveform information. For example, sequences of images can be stored and recalled. Mossberg, U.S. Pat. No. 5,276,637.

Notwithstanding the foregoing developments in the prior art, there is a need for devices and methods that permit optical data routing. In particular, there is a need for such devices that can perform passive routing of data at high speed.

DETAILED DESCRIPTION

1. Terms

Figure 1:
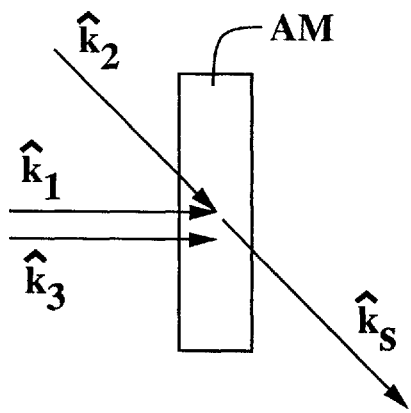
FIG. 1 schematically illustrates one possible way in which a frequency-selective active material is programmed using two sequentially applied programming pulses $\hat{k}_1$ and $\hat{k}_2$ (of which $\hat{k}_1$ is an "address pulse" and $\hat{k}_2$ is a "direction pulse"), and is subsequently used to produce a "signal pulse" $\hat{k}_s$ when the material receives a "data pulse" $\hat{k}_3$, after programming, comprising a temporal waveform substantially similar to the temporal waveform of the address pulse.

The following terms and expressions are used herein:

"Light" is any suitable electromagnetic radiation, and is not limited to the visible portion of the electromagnetic spectrum.

"Optical beam" or "light beam" is electromagnetic radiation propagating in a defined, substantially single direction ($\hat{k}$), such as a laser beam, from a source, as contrasted with radiation extending in many or all directions from a source, such as sunlight from the sun. An optical beam comprises an electrical field that exhibits wave behavior.

"Optical pulse" is any temporal waveform in an optical beam, wherein the waveform has a beginning and an end. An optical pulse can be modulated between the beginning and the end so as to encode data.

"Optical stream" or "optical data stream" is a temporal waveform in an optical beam having a waveform the beginning and end of which are not constrained.

"Propagation direction" of an optical beam or pulse is the wave vector of the beam; i.e., the orientation of the beam or pulse in space.

"Temporal waveform" or "temporal structure" of an optical beam or pulse is the waveform, as a function of time, of the electrical field component of the beam or pulse as used in data transmission and processing according to the present invention.

An "active material" is a material that can passively deflect, according to the present invention, an optical beam or pulse having a particular temporal structure interacting with the material, the deflection occurring as a result of the optical beam or pulse interacting with structured spatial-spectral gratings formed in or on the active material by programming.

A "grating" is a spatially dependent absorption pattern or a spatially dependent variation of index of refraction in an active material, or a spatially dependent reflective pattern on an active material. A grating will exhibit reflection of an incoming optical beam if conditions suitable for Bragg scattering, as known in the art, exists.

"Color" of an optical beam is a designation of the wavelength ($\lambda$), or the frequency ($\nu$), of the electromagnetic radiation comprising the beam.

"Period" ($\tau$) of an electromagnetic radiation is the reciprocal of the frequency (i.e., $\tau=1/\nu$).

"Frequency-selective material" is an active material according to the present invention that intrinsically has structures therein or thereon each of which being responsive to an individual wavelength, and thus to an individual frequency, of electromagnetic radiation. Normally such materials are transmissive to the electromagnetic radiation to allow the radiation to interact with such structures within the thickness dimension of the material.

"Frequency non-selective material" (also termed "spatially selective material") is an active material according to the present invention that is not intrinsically frequency-selective but can support a spatially structured grating with sufficient resolution to record optical interference fringes produced by beams of the electromagnetic radiations to be employed, or that can undergo localized changes in absorptivity or refractive index upon exposure to light or other stimulus that are proportional to the time-integrated total intensity of light at said locales.

"Homogeneous absorption bandwidth" or "homogeneous absorption linewidth" ($\Delta\nu_h$) is the frequency interval over which individual atoms or molecules in a frequency-selective active material will absorb electromagnetic radiation. In the context of a grating, the homogeneous absorption bandwidth is the minimal frequency range to which the grating can respond; i.e., the frequency resolution of the grating.

"Inhomogeneous absorption bandwidth" or "inhomogeneous absorption linewidth" ($\Delta\nu_i$) is the frequency interval over which a frequency-selective active material as a whole exhibits absorption of electromagnetic radiation. In the context of a grating, the inhomogeneous absorption bandwidth is the total frequency range over which the grating can interact.

"Inhomogeneously broadened absorber" (abbreviated "IBA") is a frequency-selective active material exhibiting an inhomogeneous absorption linewidth that is broader, typically much broader, than any homogeneous absorption bandwidth of the material. When a temporally encoded optical pulse impinges on an IBA, and if the data encoded in the optical pulse fall within the $\Delta\nu_i$, certain atoms or molecules within the IBA will experience frequency-dependent changes in their energy levels, resulting in a change in the IBA's absorption profile. The IBA can thus "record" the power spectrum of the optical pulse in various spectral channels of the IBA, each "channel" corresponding to a particular $\Delta\nu_h$. The Fourier transform of a pulse can be stored in an IBA by recording the spectral interference of two temporally separated pulses. IBA materials are discussed generally in Babbitt et al., "Convolution, Correlation, and Storage of Optical Data in Inhomogeneously Broadened Absorbing Materials," *Proceedings of SPIE—The International Society For Optical Engineering*, Vol. 639, Advances in Optical Information Processing II (April 1986), pp. 240–247, incorporated herein by reference. Other relevant information concerning IBA's can be obtained from U.S. Pat. No. 5,276,637 to Mossberg, incorporated herein by reference.

"Homogeneous dephasing time" or "homogeneous lifetime" ($\tau_h=\Delta\nu_h^{-1}$) is a time over which individual atoms or molecules can coherently respond (e.g., their phase memory lifetime). It is no longer than about twice the decay time of individual atoms or molecules, within an IBA, from the excited state resulting from exposure of the atoms or molecules to a particular frequency of electromagnetic radiation.

"Programming" is the controlled modification of absorptive or refractive properties of an active material so as to create spatial-spectral gratings necessary for waveform-controlled deflection of an optical beam or pulse according to the present invention.

An "optical router" according to the present invention is, at least, a spatial-spectral grating that produces an output pulse in at least one desired direction whenever the grating receives an input pulse comprising a temporal waveform substantially matching a corresponding address code.

Other terms used herein are defined as required below.

2. Elementary Concepts

As is known in the art, light consists of electric and magnetic fields. These fields are detectable and thus definable in terms of their effect on electrically charged particles, atoms, or molecules, or on matter in general. Most interactions involving light and matter are mediated by the electric-field component of light.

Optical beams having the simplest structure are beams comprising plane waves. In a plane-wave optical beam, the electric field component has a constant value everywhere along geometrical plane surfaces oriented perpendicular to the propagation direction of the beam. The distance between the plane surfaces is constant whenever the optical beam is monochromatic, i.e., comprised of a single color. For a monochromatic light beam, the distance between the planes is the wavelength $\lambda$. Monochromatic plane waves are constant in time and exhibit no temporal structure.

Optical beams having complex temporal structure are comprised of monochromatic plane waves of a variety of different colors. For example, a temporally structured plane-wave optical beam can be regarded as an assemblage of superimposed monochromatic plane waves having various wavelengths.

Each optical beam or pulse having a different temporal structure has a corresponding unique assemblage of such monochromatic constituent parts, i.e., a unique "Fourier transform." A Fourier transform is a function of frequency that provides the amplitude and phase of all the individual monochromatic plane waves in the decomposition. The "phase" refers to the displacement of a constant electric-field planes of the plane waves at some reference time and position.

One can cause a monochromatic plane-wave optical beam to change its propagation direction in a variety of ways. One way generally familiar to persons of ordinary skill in the art is by using a grating. A representative way to visualize a grating is to consider an assemblage of thin, parallel, slightly reflective sheets disposed superposedly relative to each other. Each sheet is separated from adjacent sheets by a fixed distance "a". If one directs an optical beam so as to be incident on such a grating, and if the angle of incidence $\theta$ satisfies the condition:

$$(2a)\cos\theta = m\lambda$$

wherein $\lambda$ is the incident beam's wavelength and m is an integer, a reflected beam will be generated. The foregoing expression is referred to as Bragg's Law. The basic result is that the grating reflects an optical beam only when the beam impinges the grating at certain angles of incidence $\theta$. Only at such values of $\theta$ will wavelets of light scattered from each individual reflective "layer" of the grating constructively interfere to produce a strong overall reflection of the beam. As can be ascertained from Bragg's Law, the angles at which reflection will occur depend upon the wavelength $\lambda$ of the incident monochromatic plane-wave optical beam and on the layer spacing a.

If the grating is reflective only for light of a particular color, the grating can only deflect light of that particular wavelength. On the other hand, if many different gratings, each of which being responsive to a light of a different color, are superimposed in such a way that the reflectivity, plane spacing, and displacement of the layers can be independently controlled, a multicolored light beam incident on the composite grating at a specific angle $\theta$ can be reflected if the various spacing and other properties of the individual color-specific gratings are adjusted to allow reflection of all the constituent colors of the beam.

3. Programming Active Materials

As discussed above, a plane-wave optical beam or pulse possessing a specific temporal waveform (i.e., variation of the electrical component of the light as a function of time) has a unique spectral decomposition in terms of monochromatic plane-wave beams. According to the present invention, "programming" (as defined above) an active material involves creating an array of spatial-spectral gratings on or in the active material that collectively cause an optical pulse of a particular temporal structure to be deflected from the active material after the active material encounters an "input pulse" or "data beam" comprising a specific temporal waveform.

Frequency-selective active materials can be envisioned as an assemblage of a large number of spatial-spectral coordinates (which can be regarded as "loci" or "channels") each locus being responsive to a particular color (i.e., each locus has a particular v). Since each locus thus has a particular x, y, and z "dimension," as well as a distinctive frequency "dimension," programming effectively utilizes four dimensions in the active material. Each locus or channel typically consists of a number of atoms, although theoretically a locus or channel could be represented by as few as one atom or molecule of the material. What is necessary is that the frequency-selective material have a sufficiently large number of such spatial-spectral loci to represent all spectral and spatial properties of the optical pulses used.

For subsequent use in routing plane-wave optical beams, a frequency-selective active material can be programmed according to the present invention using two programming pulses. One of the pulses is termed an "address pulse" that encodes the particular temporal waveform to which the active material is to be made responsive. I.e., the address pulse renders the active material capable of discriminating, from all "information" that may subsequently enter the material, temporal waveforms that substantially match the address waveform. The other pulse is termed the "direction pulse." The direction pulse interacts with the material from a direction of incidence that determines the propagation direction, from the material, of pulses produced by the material in response to the material encountering, after programming, a corresponding address code.

Other programming methods employing optical beams or pulses are also possible, as disclosed herein. In any event, the address pulse is typically modulated in order to provide an appropriate temporal address waveform. The direction pulse is termed a "brief" pulse, by which is meant a pulse in which its duration is its shortest temporal feature. Preferably, the direction pulse used to program a particular optical router according to the present invention has a duration that is shorter than the shortest temporal feature of any data or address that has entered or will enter the router. The direction pulse typically has a logic "0-1-0" profile with no other modulation. The direction-pulse bandwidth is normally the reciprocal of the duration of the pulse. Alternatively, the direction pulse can consist of two frequency-chirped pulses.

The address pulse also has a finite total duration. (The duration is preferably less than the homogeneous lifetime of the material.) In addition, because the address and direction pulses each have a specific temporal structure, each can be decomposed to a unique combination of one or more monochromatic plane waves. The interference of these two pulses has a power profile (which is the square of the Fourier transforms of each programming beam) that exhibits a unique profile of peaks and valleys to which various individual loci, distributed spatially in or on the active material, can respond in a gradient-forming way. I.e., different loci distributed spatially in or on the material selectively interact with the various same-color monochromatic plane wave components from each beam. Interferences between constituent monochromatic plane waves of unequal color are not recorded in the grating.

The plane-wave decomposition of a temporally structured optical pulse is uniquely related to the temporal structure of the pulse. Thus, an interference of two programming pulses is also unique, and the features of the composite grating created in or on the active material in response to such an interference specifically correspond spatially and spectrally to the particular interference, and will be keyed to the specific temporal structures of the two programming pulses.

After programming, the resulting grating in or on the active material can selectively interact with a temporal structure, substantially similar to the temporal structure of the address pulse, encoded in a subsequent "data" beam, and substantially no other suitably chosen temporal structures. (Interaction with "substantially no other" temporal structures means that the grating interacts with "other" temporal structures by producing, at most, an acceptably relative low level of "noise.")

Address and direction pulses can be directed toward a frequency-selective active material in any order, including simultaneously. In many applications involving such materials, the address pulse precedes the direction pulse. Normally, if the address pulse comes after the direction pulse, the address pulse is time reversed compared to when the address pulse precedes the direction pulse.

More than one set of programming pulses (each set consisting of one address pulse and one direction pulse) can be used to enhance programming efficiency for data routing of a particular temporal waveform in a given direction. One or more additional such sets can also be employed for reprogramming or program restoration as required.

Thus, in general, the two programming pulses and the data beams collectively provide, at least, two addresses and one set of data. Which beams contain which of these elements is generally arbitrary so long as the phase-matching condition:

$$\vec{k}_s = \vec{k}_3 + \vec{k}_2 - \vec{k}_1$$

is met. Preferably, one of the addresses is convolved into the first programming pulse, but this is not required. If no address is convolved into the first programming pulse, then one of the addresses must be entered in time-reversed form, as is known in the art.

The data set can be on any beam (other than $k_s$), but preferably on either the second programming beam or on the data beam. If the data set is on the first programming pulse, the data will exit the material (in the $k_s$ pulse) in a time-reversed manner.

Sequential impingement of the two programming pulses when programming a frequency-selective material is possible because the material will "store" the information encoded in the first programming pulse in a manner analogous to that by which optical memories store information. (Reference is made, for example, to U.S. Pat. Nos. 5,276, 637; 4,158,890; 4,670,854; and 4,459,682.) The duration of such storage depends on the particular material and the physical environment of the material. In any event, in order to create the requisite interference, the second programming pulse must interact with the active material before the stored information from the first programming pulse is lost. In general, the maximum time between the first programming pulse and the second programming pulse should not be greater than $T2 = (\Delta v_h)^{-1}$. The longer the second programming pulse is delayed relative to the first programming pulse, the less efficient the production of an "output" pulse.

When programming frequency non-selective materials, it is typically required that both programming pulses interact with the material simultaneously.

A variety of frequency-selective active materials exist that can be modified in a spatial-spectral way by optical beams interacting with them. Frequency-selective active materials are characterized by a particular homogeneous bandwidth. The homogeneous bandwidth, as defined above, specifies the minimum frequency increment that the active material can detect. Optical beams separated in frequency (i.e., color) by more than the homogeneous bandwidth will act independently on the active material. The homogeneous dephasing time reflects the maximum duration of a temporal waveform that can be encoded in the active material. The inhomogeneous bandwidth is an expression of the total frequency range over which light beams or pulses can affect the active material. The "inhomogeneous dephasing time," $(\Delta v_i)^{-1}$ is an expression of the duration of the shortest feature in any temporal waveform that can be resolved by the active material.

Gratings can be formed in frequency-selective active materials by various mechanisms including programming beam-mediated changes in absorption, as discussed above. Another programming mechanism comprises imparting localized frequency-dependent changes in the refractive index of the active material. Other representative means for creating gratings are disclosed herein and in various of the references listed herein that are incorporated into this disclosure by reference.

One specific basis by which a frequency-selective active material can preserve a grating formed by the impingement of programming pulses is termed "Persistent Spectral Hole Burning," abbreviated "PSHB." See. e.g., Moerner (ed.), *Persistent Spectral Hole-Burning: Science and Applications*, Springer-Verlag, New York (1988), incorporated herein by reference. PSHB involves a selective modification of the characteristics of an active material so as to form a grating in the material. Several conditions are required. First, the absorption bandwidth of the material must be inhomogeneously broadened. This means that the bulk absorption of the material is due to a broad frequency ensemble of narrow-linewidth absorption lines each exhibiting a distinctive homogeneous absorption bandwidth. Each such narrow-linewidth absorption line arises from a locus or channel in or on the material termed an "absorber." The homogeneous absorption bandwidth exhibited by each absorber must typically be very narrow. The much broader inhomogeneous bandwidth of the material is the result of random-frequency shifts of resonances of individual absorbers by local crystal fields, strains in the material, and other microenvironmental factors.

Upon optical excitation of an absorber with light of a single wavelength, the absorber will make a transition to an excited electronic state if the homogeneous absorption bandwidth of the absorber is in resonance with the excitation frequency. Afterward, the absorber can decay back to its ground state. Alternatively, and preferably, if there are alternate states into which the absorbers may decay from the excited state, then some fraction of the excited absorbers can end up in the alternate state rather than relaxing to the original ground state. (Relaxation into the alternate state may be assisted by exposure to radiation of a different wavelength than the excitation wavelength. Persons of ordinary skill in the art refer to such relaxations as "gated.") Absorbers that relax to an alternate state contribute to a decreased absorption by the material of the light because fewer absorbers are available to resonantly absorb light. Such gating is discussed, for example, in U.S. Pat. No. 5,239,548, incorporated herein by reference.

A decreased absorption at a wavelength where the absorber has been modified as described above is termed a spectral "hole," as known in the art, and processes by which absorbers are modified in such a manner are termed "spectral hole burning." It is generally believed that the number of holes that can be burned in an absorber locus in an active material is roughly expressed by the ratio of the inhomogeneous bandwidth to the homogeneous bandwidth. In active materials that are suitable for PSHB, inhomogeneous bandwidths typically range from 1 GHz to several terahertz, and homogeneous bandwidths typically range from 1 kHz to several GHz. The ratio of these two quantities can be as high as $10^7$ in some materials at liquid helium temperatures.

The intensity of the optical pulse(s) used for programming should practically be sufficiently great to yield a measurable effect in routing capability of the active material. In other words, the intensity should be sufficient to provide a satisfactory signal-to-noise ratio in a deflected signal (i.e., output) pulse. Optimally, with devices programmed to produce signal pulses in only one direction, the programming pulses are sufficiently intense to produce a Fourier component having the highest intensity capable of exciting about half the population of excitable atoms in the material to an excited state. Since the foregoing poses an upper limit on the number of atoms that can be excited in the material, it will be appreciated that rendering the active material capable of producing signal pulses in multiple directions requires that correspondingly less intense programming pulses be used. This, in turn, can place a limit on the maximal number of different directions in three-dimensional space in which output pulses can be directed from a unit of active material, depending upon the detection sensitivity of downstream equipment.

Once a frequency-selective material is programmed, as described above, the material must be used for optical data routing before the program is lost from the material. If it should become lost, the program in the material must be restored before the material can be used again for similar routing. The duration of the program in such materials is a function of the population grating lifetime of the material, which is normally different from the excited-state lifetime.

As an alternative to forming frequency-selective gradients in or on an active material, as described above, it is also possible to use a frequency non-selective active material programmed with a "volume hologram." The principles underlying such holograms can be found, for example, in Mazurenko, "Interference of Spectrally Dispersed Light," *Opt. Spectrosc.* 56:357 (1984); Mazurenko, "Reconstruction of a Time-varying Wavefront by Multibeam Interference," *Sov. Tech. Phys. Lett.* 10:228–229; Mazurenko, "Reconstruction of a Nonstationary Wave Field by Holography in a 3-D Medium," *Opt. Spectrosc.* (*USSR*) 57:343–344 (1984); and Brady et al., "Volume Holographic Pulse Shaping," *Optics Lett.* 17:610–612 (1992). Use of a volume hologram involves the interference of two light fields over a volume of photorefractive material (i.e., an active material that experiences a change proportional to the intensity of electromagnetic radiation to which the material is exposed, yielding a periodic structure in the material that is frequency-dependent).

Frequency-selective spatial structures and classic holographic techniques can be combined to realize many of the functionalities of frequency-selective materials. Mazurenko, "Holography of Wave Packets," *Appl. Phys. B* 50:101–114 (1990). Some experimental demonstrations of this capability in areas not involving spatial routing of optical beams have been reported. Weiner et al., "Femtosecond Spectral Holography," *J. Ouant. Electronics* 28:2251–2261 (1992). (Because the foregoing references are pertinent to an understanding of the present invention, they are expressly incorporated herein by reference.)

It is also possible to form an array of different spatial gradients in or on a frequency non-selective active material that perform the same function as a composite gradient formed in a frequency-selective active material.

An image can also be programmed into an active material to allow routing of an image encoded in a subsequent data beam. The simplest image is defined by two plane waves; generally, an image comprises multiple plane waves. The principles of the present invention as applied to plane-wave beams are directly applicable to combinations of plane-wave beams. (Also, in the prior art, it is known that images can be stored and recalled from materials; see, e.g. U.S. Pat. No. 5,256,637.) Basically, such programming would involve the interaction of the material with an image-encoding set of direction beams (rather than a simple plane-wave direction beam).

Another possible way in which to create a suitable grating in or on an active material is by physical means, such as using an electron beam. An electron beam is particularly suitable for forming a surficial gradient on, for example, a frequency non-selective active material. For creating surficial gradients, an electron beam is preferable to an optical beam because of the much greater spatial resolution achievable using an electron beam compared to an optical beam. When gradients are formed using an electron beam, it is normally not necessary for the active material to be a frequency-selective material. Furthermore, formation of gradients using an electron beam can be performed at room temperatures, thereby eliminating any need to maintain the material at cryogenic temperatures. Nevertheless, the gradient formed using an electron beam must still be frequency selective.

Scattering of light from a surficial gradient is according to a relationship analogous to Bragg scattering, discussed above.

In general, we have found that the frequency selectivity of a surficial gradient is not as efficient as that of a three-dimensional (3-D) spatial-spectral gradient. Nevertheless, the frequency selectivity of surficial gratings appears to be similar to that of a volume hologram.

An electron beam can also be used to create a 3-D grating in an active material, especially frequency non-selective materials, by building up the active material layer by layer, wherein each individual layer has a substantially two-dimensional (2-D) grating formed by an electron beam before the subsequent layer is applied. Formation of each 2-D grating is performed such that all the resulting 2-D gratings, after formation of all layers of the material is complete, cooperatively interact with an input data beam in a manner similar to a spatial-spectral grating formed optically, as described above.

In yet another candidate approach to programming an active material, whether frequency-selective or frequency non-selective, two monochromatic optical beams are employed that have controllable amplitude and phase. During programming, the beams are tuned continuously so as to sweep across the frequency range of interest. One or both of said beams can be modulated so as to encode information. With frequency-selective materials, this approach reaches each frequency channel of the material individually with an interference of the two beams. No pulses are required. The sweep period in this approach is preferably less than the population grating lifetime of the material.

In any event, the grating formed in or on an active material, whether frequency-selective or frequency non-selective, comprises frequency-selective and directionally selective elements. I.e., a grating according to the present invention is both frequency selective and spatially selective. The gradient must be capable of deflecting a temporally structured optical pulse (corresponding to an address pulse used for programming) into a specified target direction that is dependent on the temporal profile of the optical pulse. That is, programming creates in or on an active material, for each desired output direction, a composite grating that differentially interacts with the set of Fourier (i.e., spectral) components of each address-simulating waveform in an data beam such that the total of all outputs of the composite grating in the desired direction produces the desired output temporal profile whenever the corresponding address temporal profile in the data beam presents itself to the active material. If it is desired to have the active material produce multiple signal pulses each in a different direction, it is preferred that a separate programming be performed, each involving, at least, a different direction pulse.

4. Fundamental Enabling Relationships

The following relationships substantially expand upon the temporal and spatial processing capabilities found in optical memories to direct, for the first time, temporally structured optical signals originally propagating along a common direction into different and distinct output directions according to the precise temporal waveform encoded onto each signal.

A. Frequency-Selective Active Materials

We first consider representative enabling relationships for use of frequency-selective active materials. An active material's spectral resolution is denoted by $\Delta v_h$ (the homogeneous absorption bandwidth) and its total bandwidth (i.e., inhomogeneous absorption bandwidth) by $\Delta v_i$. I.e., a frequency-selective active material exhibits inhomogeneous absorption line broadening. The absorptivity of the active material is modified in proportion to the total energy fluence per unit volume and unit frequency to which the active material is exposed. Absorption modifications in or on the active material can occur, for example, by any of various mechanisms leading to persistent spectral hole burning, as described above. See also, Moerner (ed.), *Persistent Spectral Hole-burning: Science and Applications*, Springer-Verlag, New York, (1988); DeCaro et al., *Appl. Optics* 30:2890 (1990).

For programming, the active material is preferably exposed to two optical "programming" pulses each having a finite duration. One of the programming pulses is designated as the "address pulse," $E_{1a}(\vec{r},t)$, and provides information regarding specifically which data (encoded on a subsequent beam) is to be routed in a particular direction from the active material. The other programming pulse is designated the "direction pulse," $E_{2d}(\vec{r},t)$, and provides information regarding the desired direction that data (encoded on a subsequent beam and corresponding to information provided by the address pulse) is to be routed from the active material. For simplicity, the programming pulses are regarded as plane waves propagating in the respective directions $\hat{k}_1$ and $\hat{k}_2$. (The subscripts denote the temporal order of the pulses. For convenience in presenting general principles, the address pulse is represented as preceding the direction pulse. However, based on the foregoing discussion regarding programming, it is to be understood that the programming pulses can be in any order with respect to each other, including simultaneous.)

In general, a representative programming beam $\epsilon$ can be represented as $$E_\epsilon(\vec{r},t) = \int_{-\infty}^{\infty} E_\epsilon(v)\exp[-2\pi i v(t - \vec{r} \cdot \hat{k}\epsilon 8/c)]dv \quad (1)$$

where $E_\epsilon$ is the Fourier transform of beam $\epsilon$ at an arbitrary spatial origin ($E_\epsilon(\vec{r}=0,t)$). The total optical energy fluence seen by the active material as a function of spatial and spectral position is proportional to $$|E_{tot}(\vec{r},v)|^2 = |E_{1a}(v)|^2 + |E_{2d}(v)|^2 + \{E_{2d}(v)E^*_{1a}(v) \exp[-2\pi i v \vec{r} \cdot (\hat{k}_2 - \hat{k}_1)/c] + c.c.\} \quad (2)$$

The interference terms at the right of Equation (2) contain detailed information on the spectral and spatial behavior of the electric fields of the two programming beams. In the instant situation involving plane-wave programming beams, the interference terms consist of relatively simple spatial gratings distributed in a potentially complex fashion in frequency space. The interference information is communicated to the active material through absorptivity (or index of refraction) changes proportional to $|E_{tot}(\vec{r},v)|^2$.

Illumination of the active material after programming is now considered. Illumination is via a plane-wave "data beam" of unit wave vector $\hat{k}_3 = \hat{k}_1$. The data beam is normally temporally encoded with data to be routed by the active material. At least some of the data encoded in the data beam corresponds to information encoded in a previous address pulse. By virtue of the spatial-spectral grating created in or on the active material during programming, the active material now acts as a spatial-spectral filter and produces a "signal pulse" or "output pulse" (designated as $\hat{k}_{sig}$ or simply $\hat{k}_s$) that propagates from the active material in a direction parallel to the direction pulse. The information content of the signal pulse is determined by the address pulse.

The total time interval spanned by the two programming pulses is preferably substantially shorter than $\Delta v_h^{-1}$. Also, the spectral bandwidths of the programming pulses are preferably less than $\Delta v_i$. Thus, the temporal and spatial structure of the signal pulse is given by $$E_{sig}(\vec{r},t) \propto \int_{-\infty}^{\infty} E_3(v)E_2(v)E_1^*(v)\exp[2\pi i v(t - \vec{r} \cdot \hat{k}_2/c)] \quad (3)$$

where $E_3(v)$ is the Fourier transform of the data beam (see Equation (1)). In Equation (3), the intensity of the programming and signal pulses is sufficiently low that the active material responds linearly to the radiation.

The temporal envelope of the signal pulse may also be expressed as the convolution of the direction pulse with the cross-correlation of the address pulse and the data beam. If the direction pulse is "brief," as defined above, the signal pulse is large whenever the address and input pulses are temporally identical. In such an instance, the signal field will be given by the centrally peaked autocorrelation function of the common address and input pulse temporal waveforms.

Spatial routing of optical data from a frequency-selective active material can be realized as follows. First, the material is programmed as described above. In the foregoing programming method, the number of distinct pairs of address and direction pulses corresponds to the number of different data-routing directions desired. (It is also possible to program the material to route multiple different temporal waveforms in the same direction.) Each address pulse propagates in the same direction relative to the material and has a temporal waveform (or "address") different from all other address pulses from which its address is to be distinguished by the material. The "i"th direction pulse propagates in a direction that is different from that of any of the other direction pulses and, again, is temporally shorter than any of the temporal features encoded onto its corresponding "i"th address pulse. The effect of programming in this manner is the formation of multiple spatial-spectral holograms in the active material, wherein each hologram is encoded into the material by a specific pair of programming pulses. The "i"th hologram in the active material serves to deflect into the corresponding direction all input signals that are incident along $\hat{k}_3$ and have substantially the same temporal waveform as the $i^{th}$ address pulse. Signal (i.e., "output") pulses are temporally reshaped according to Equation (3) and can be configured to consist of a single intense autocorrelation spike.

According to one scheme, as shown in FIG. 1, a data stream in a data beam $\hat{k}_3$ is made incident on the active material AM along a direction $\hat{k}_3=\hat{k}_1$. Whenever a temporal segment (i.e., the "i"th segment) in the data beam reproduces a corresponding temporal profile of the corresponding "i"th address pulse, a signal, or "output," pulse $\hat{k}_3$ is deflected into a direction parallel to $\hat{k}_2^{(i)}$.

Figure 2A:
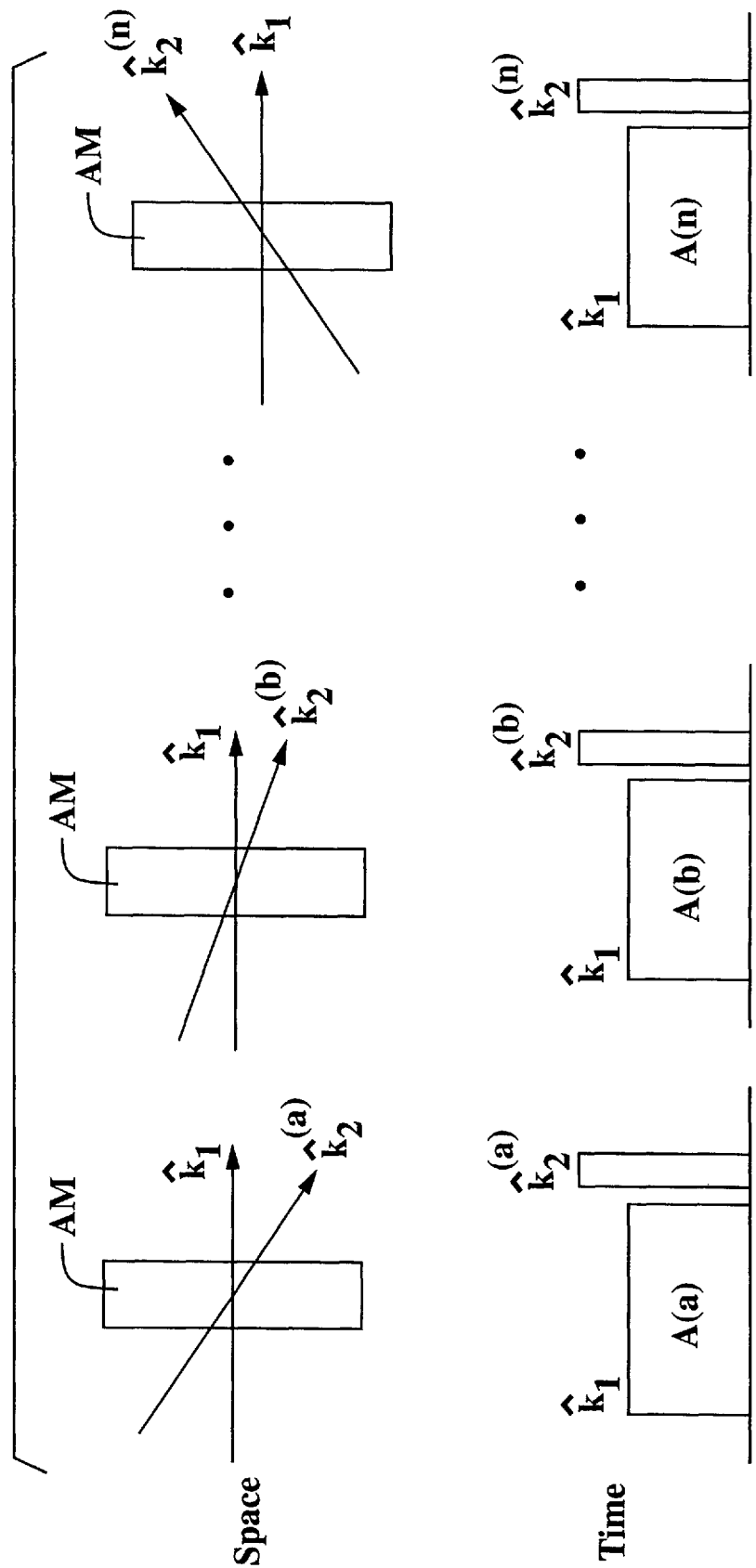
FIG. 2A schematically illustrates a representative scheme for programming a frequency-selective active material for use as an optical router, according to the present invention, capable of producing output pulses in any of various spatial directions.
Figure 2B:
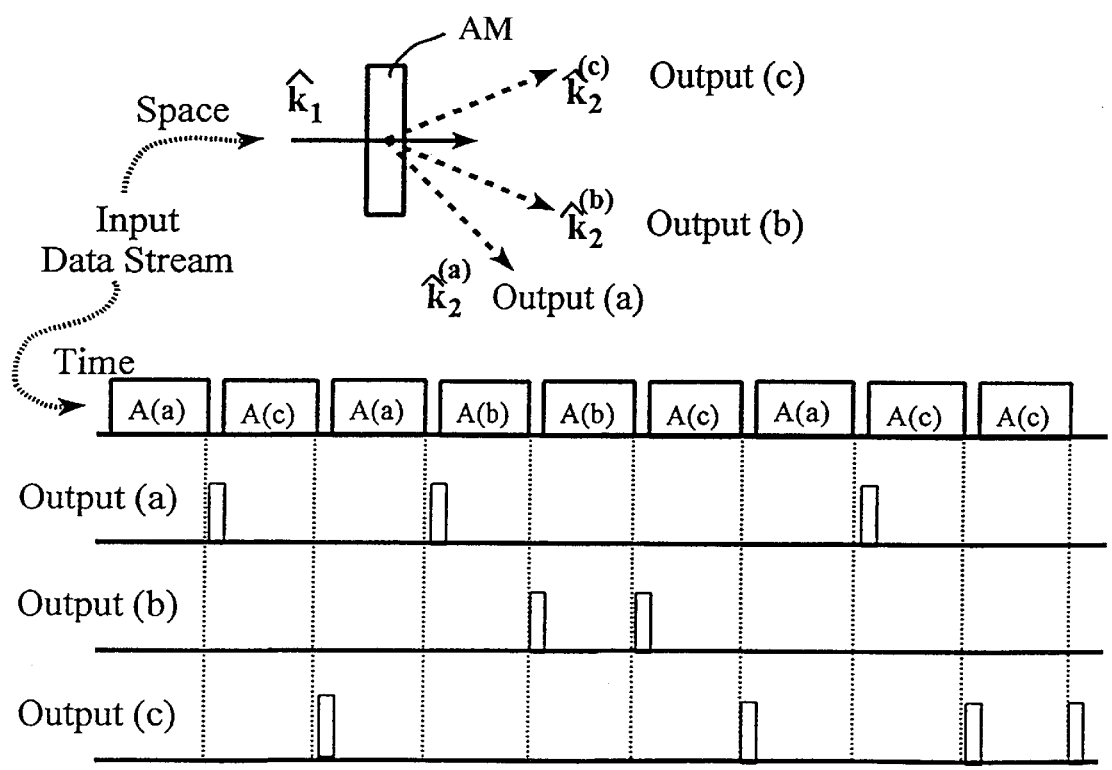
FIG. 2B schematically depicts the selective production of output pulses by an optical router, programmed as shown in FIG. 2A, in response to inputs of temporal waveforms substantially matching corresponding address codes used during programming.

Representative programming and routing processes using a frequency-selective active material are schematically depicted in FIGS. 2A–2B. In FIG. 2A, a series of n pairs of temporally non-overlapping programming pulses $\hat{k}_1$ and $\hat{k}_2$ are successively made incident on a frequency-selective active material AM so as to form spatial-spectral gratings in the active material necessary for optical data routing. It is pointed out that each direction pulse ($\hat{k}_2^{(a)}$, $\hat{k}_2^{(b)}$, ... $\hat{k}_2^{(n)}$) has a different direction relative to the material AM. Each address pulse has the same direction, $\hat{k}_1$, but has a unique address (A(a), A(b), ... A(c)).

In FIG. 2B, a data stream on a data beam comprising a succession of different temporal addresses: A(a), A(b), and A(c), is shown as a time-domain profile in the middle of the figure. The data stream, modulated into an optical beam ("data beam"), is passed (in the common address-beam direction $\hat{k}_1$) into an active material AM previously programmed using an address pulse comprising addresses A(a), A(b), and A(c) and corresponding direction pulses. (For simplicity, FIG. 2B depicts a case in which the addressed bits within the data stream of the data beam do not overlap in time.) Whenever the data stream contains an address A(i), wherein i=(a), (b), or (c), an "output pulse" (i.e., "signal pulse") of light is generated in the direction $\hat{k}_2^{(i)}$, as determined by the corresponding direction pulse. As can be seen, each of the outputs has a different direction relative to $\hat{k}_1$.

FIG. 2B does not show the low-level crosstalk signals that can occur whenever a data stream is present but bearing a different address $\hat{k}_2^{(i)}$. The strength of the crosstalk noise is dependent on the orthogonality under cross-correlation of the address codes employed. I.e., cross-correlation of address A(a) with address A(b) or address A(c) yields "noise." Conversely, cross-correlation of address A(a) with itself by the programmed active material produces an output, distinguishable from noise, deflected in the corresponding direction. (Analysis of analogous background signals has been described previously, but only in the context of pulse code-division communication systems, Salehi et al., *J. Lightwave Tech.* 8:478 (1990), not spatial redirection of optical data. Rather, the previously described analyses employed spectral filters that passed, in-line only, optical pulses having specific temporal profiles; i.e., the filters functioned only as multiplexers.)

The minimal amount of signal relative to noise that can be accommodated will depend upon how much noise can be accommodated (i.e., upon the minimal amount of contrast of signal relative to noise). This will be a function of the sensitivity and capability of optical-data processing equipment situated downstream of an optical "router" according to the present invention (as described above), such as detector sensitivity, number of output channels, synchronization of detection, etc. For example, with respect to number of output channels, each output channel of an optical router according to the present invention typically produces some noise. The total noise of the router tends to be cumulative among all outputs. Thus, downstream components must be able to resolve signals at each output relative to the accumulated noise.

Figure 3:
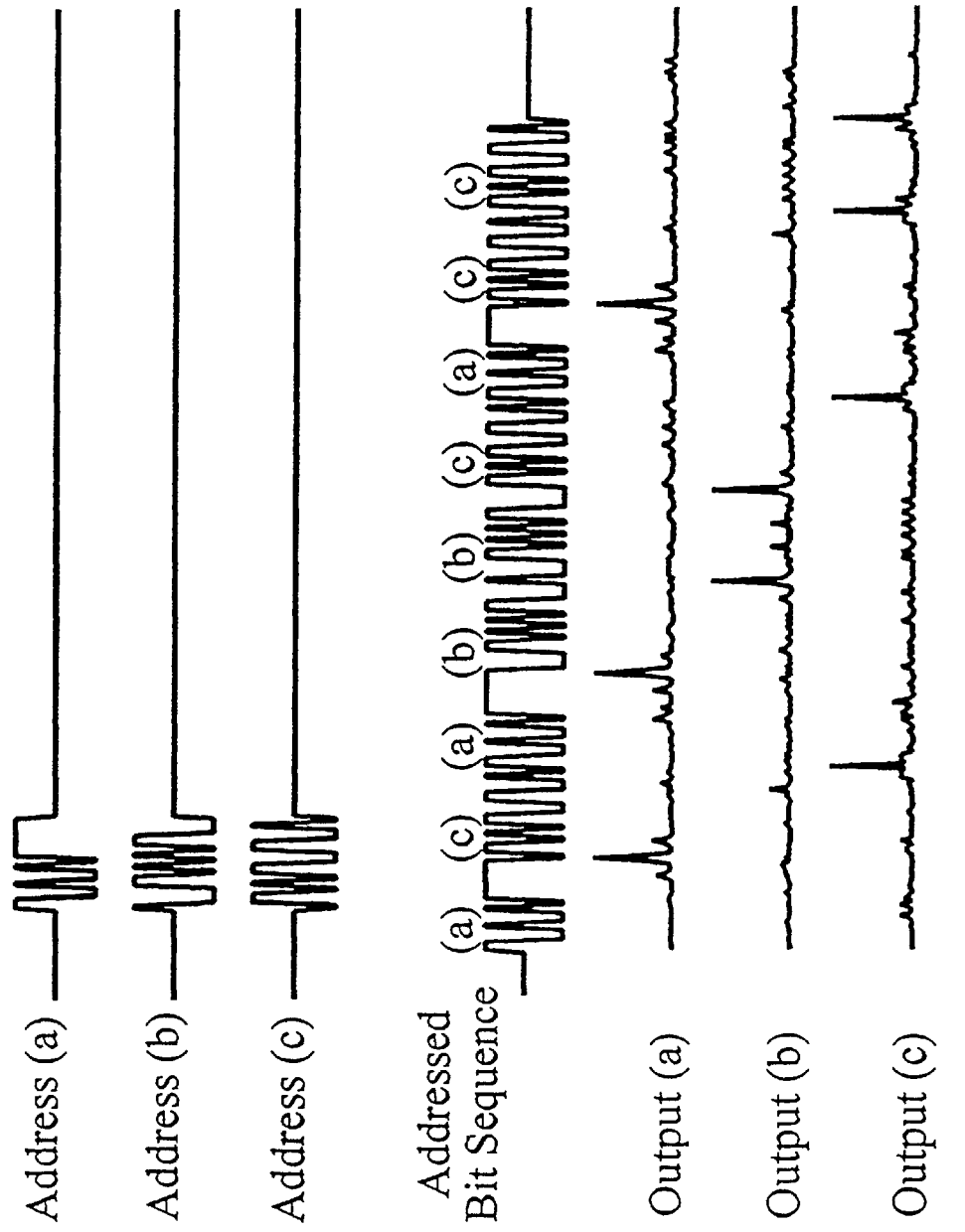
FIG. 3 shows three representative different address codes, an input temporal profile comprising an addressed bit sequence including waveforms corresponding to each of the three address codes, and corresponding output pulses (as functions of time) produced by an optical router according to the present invention.

The traces shown in FIG. 3 were generated using Equation (3) to generate light intensity profiles as a function of time deflected into the three different output directions, similar to that shown in FIG. 2B, by an optical router as determined using three different address codes. The address codes are separately profiled in the upper portion of the figure and are labeled "Address (a)," "Address (b)," and "Address (c)," respectively. As can be seen, each address is a different function of time (i.e., has a different temporal structure). The data stream of the data beam is depicted in the middle portion of the figure and is labeled the "Addressed Bit Sequence." Corresponding output-pulse signal intensities are shown in the lower portion of the figure as functions of time and are labeled "Output (a)," "Output (b)," and "Output (c)," respectively. The addresses used were 16-bit long binary-phase codes that were randomly generated. As can be seen, crosstalk among the various outputs (a), (b), and (c) was small.

FIG. 3 also shows each output as being somewhat de-convolved relative to the corresponding addresses. Thus, each output is a spike pulse, relative to the more complex temporal structure in the corresponding address.

FIG. 3 also shows addresses that are temporally relative to each other. However, the addresses need not be temporally ordered. In any event, in the data beam represented by the "addressed bit sequence," all the information corresponding to, for example, Address (a) must interact with the active material before Output (a) will be produced. (Likewise for Addresses (b) and (c) and Outputs (b) and (c), respectively.) Normally, the production of an output pulse occurs immediately after the corresponding entire address, in the data beam, interacts with the material. However, a delay can also be imposed, up to roughly the homogeneous lifetime of the active material.

A variety of different addressing schemes are possible. These can take the form of amplitude modulation, phase modulation, and/or frequency modulation of an optical beam. In addition, although the address-encoded bits depicted in FIGS. 2A–2B, and in FIG. 3 are sequential (i.e., separated from each other by time), it is possible for the bits to temporally overlap, so long as the codes are sufficiently orthogonal to maintain the desired minimal crosstalk among the various outputs. I.e., the addresses must be distinguishable from each other on the basis of their temporal modulation. For example, the cross-correlation of each address with another of the addresses must be small relative to when each address is cross-correlated with itself.

B. Frequency Non-Selective Active Materials

We now turn to optical data routing using active materials that are not frequency selective. In the following analysis, the active material has the following characteristics:

(a) The subject active material can undergo changes in absorptivity or refractive index upon exposure to light; such changes induced at specific locations on or in the material are proportional to the time-integrated total intensity of light (or gradient of light) at the specific locations. The material can be optically or chemically modifiable so that changes introduced prior to such modification are preserved while the material is simultaneously made insensitive to further optically induced changes. (Certain known holographic materials have this property.)

(b) The subject material has sufficient spatial resolution to record optical interference fringes (grating planes) produced by optical illumination, as described below.

Figure 4:
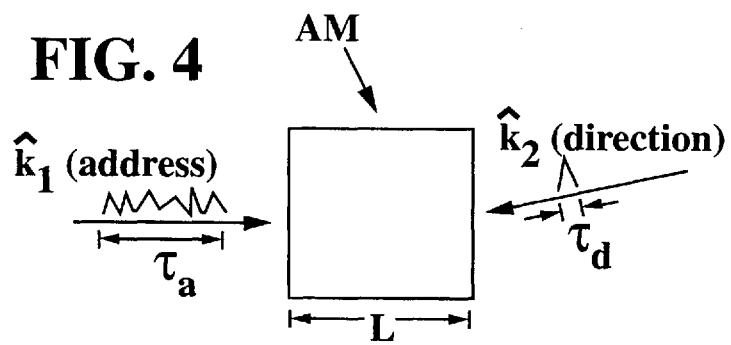
FIG. 4 schematically depicts an alternative programming scheme for an optical router according to the present invention.

Programming of the active material can be representatively performed as follows, and as depicted generally in FIG. 4: Two optical beams (designated the $\hat{k}_1$ (address) beam and the $\hat{k}_2$ (direction) beam, respectively), timed so as to simultaneously impinge on the active material AM, are made incident on the material AM. The direction beam physically overlaps each portion of the address beam as the address beam passes through the active material. This implies that the active material has a dimension L that satisfies the relation $$Ln/c \geq \tau_a/2 \tag{4}$$

wherein n is the index of refraction of the material, c is the speed of light in a vacuum, and $\tau_a$ is the duration of the address beam. The direction beam preferably has a duration shorter than the shortest significant addressing feature of the address beam. Additional output directions and associated temporal addresses are encoded in the same manner as described above in the case of frequency-selective active materials; i.e., using additional pairs of address and direction beams wherein the address beam has the same direction but a different temporal address and the direction beam has a different direction but a temporal waveform that satisfies the brevity condition given above. Routing is accomplished by impinging an address-encoded data beam on the active material in the same direction as the address beam(s). When a waveform in the data beam matches a previously programmed address waveform, a signal pulse is produced along the corresponding output direction.

In the foregoing, the maximum duration of the address waveform is preferably very short. For example, with L=1 cm, and n=1.5, $\tau_a$ is about 100 psec ($1 \times 10^{-10}$ sec).

Whether an optical router according to the present invention is used with frequency-selective or frequency non-selective active materials, frequency selectivity is imparted to the material as a result of programming (frequency selectivity must be present after programming in order to enable the material to record frequency-domain information during programming that is required for identification of temporally addressed data).

In the case of frequency non-selective materials, e.g., where surficial gratings and volume holograms are employed to provide frequency discrimination, resolution bandwidths of centimeter-scale systems are large. As a result, applications involving multibit temporal addresses (whose total duration must be less than the inverse resolution bandwidth available) can be realized whenever subpicosecond temporal resolution is available in the optical beams.

In the case of frequency-selective materials, particularly at cryogenic temperatures, resolution bandwidths on the scale of kilohertz are available. As temperatures increase, resolution bandwidth falls; nevertheless, the resolution bandwidths offered by room temperature frequency-selective materials are comparable to those offered by centimeter-scale systems employing frequency non-selective active materials.

5. Sources of Electromagnetic Radiation

Optical data routing according to the present invention requires a suitable source of electromagnetic radiation, such as a laser. While lasers that produce visible frequencies of electromagnetic radiation can be used, other bands in the electromagnetic spectrum can also be used, depending upon the type and size of the active material used. Examples of suitable lasers include, but are not limited to, semiconductor lasers, other solid-state lasers, gas lasers, and dye lasers.

Particularly in the case of frequency-selective materials, the frequency of the electromagnetic radiation must be correlated to the absorptive properties of the active material and comprise wavelengths that are-resonant with various spectral channels in the material. The electromagnetic radiation must be able to interact with a spatial-spectral grating formed on or in the active material by programming.

The frequency range, in the electromagnetic spectrum, that can be utilized in the present invention is largely a matter of practicality. In order for a physical device, such as a unit of active material, to direct light, the device must be larger than the wavelength of the light. Thus, the size of the unit of active material used in an optical router is instrumental in setting the frequency range. For example, if one wished to maintain the limiting size "D" of the active material to about 1 cm, the wavelength should generally have a wavelength of about 0.1 cm or less. Most preferably, $\lambda$ is about $D \times 10^{-4}$. (Output diffracts into an angle of about $\lambda/D$. If, for example D were equal to $\lambda$, then the light would fill D and have no angular selectivity. Therefore, $\lambda/D$ must be less than 1, and practicably 0.1 or less.)

Modulation of optical beams can be performed according to various methods as known in the art that amplitude modulate, frequency-modulate, or phase-modulate a beam of electromagnetic radiation in an information-containing way. The simplest modulation scheme is simply on or off, wherein "on" represents a binary one and "off" represents a binary zero. This type of modulation can be effected using any of various laser shutters. The modulation can be acousto-optical, electro-optical, or analogous means. An acoustooptical modulator (AOM) consists of a transparent material into which very high-frequency sound waves are introduced. The density variations within the sound wave lead to a re-direction of the laser beam while the sound wave is present. Such devices actually deflect the beam rather than switch it on an off. An electro-optical modulator (EOM) relies on electrically mediated changes in the polarizing properties of certain crystals. EOMs employ, for example, an electrically "driven" crystal between two crossed linear polarizers. With no voltage on the crystal, no electromagnetic radiation is passed therethrough. Application of a voltage pulse allows the radiation to pass. Various other modulator devices are known in the art and some lasers can be modulated directly.

6. Active Materials

An active material, as generally defined above, must be capable of supporting or otherwise providing a spatially dependent absorption or refractive-index variation. The active material can be, but need not be, optically programmable depending upon whether or not the material is to be optically programmed. In addition, suitable materials can be frequency-selective or frequency non-selective.

Normally, suitable active materials are rigid; thus, they are typically not liquids or gases. Furthermore, liquids and gases typically have bandwidths that are too narrow for many applications. Nevertheless, a liquid or gaseous material may be usable if the material is capable of sustaining a gradient for a usable length of time, and the optical bandwidth with which the material will be used is narrow.

With respect to optically programmable frequency-selective materials, one way in which inhomogeneously broadened materials can be made is by doping low concentrations of absorber atoms or molecules into a suitable crystalline or glassy host substance, as discussed in further detail below. However, suitable materials are not limited to glassy (i.e., amorphous) materials; crystalline materials can also be used.

Preferably, frequency-selective materials have an absorptive capacity of at least one absorption length of the electromagnetic radiation to be used. The homogeneous dephasing time $(\Delta v_h)^{-1}$ of the material is preferably longer than the temporal waveform of the address beam. In addition, the inhomogeneous dephasing time $(\Delta v_i)^{-1}$ is preferably shorter than the shortest temporal feature of the waveform on the address beam.

Candidate active materials having suitable $\Delta v_i$ and $\Delta v_h$ properties include, but are not limited to, $Eu^{3+}$-doped $Y_2O_3$, which has a $\Delta v_i$ value of 10 GHz and a $\Delta v_h$ value of 1 KHz at 4° K. Other candidate materials include any of various rare-earth doped $LaF_3$ (such as $Eu^{3+}$-doped and $Pr^{3+}$-doped $LaF_3$), rare-earth doped YAG (such as $Pr^{3+}$-doped YAG and $Tm^{3+}$-doped YAG), and rare-earth doped $YAlO_3$ (such as $Eu^{3+}$-doped $YAlO_3$). Examples of suitable host glassy materials, suitable for rare-earth doping, are described in "Laser Spectroscopy of Solids," in Yen and Selzer (eds.) *Topics in Applied Physics*, Vol. 49, Springer-Verlag, New York, and include (but not limited to) $SiO_2$, $GeO_2$, $B_2O_3$, and $P_2O_5$. Examples of suitable rare-earth doped glasses include Eu-doped silicate glasses, phosphate glasses, borate glasses, fluoroberyllate glasses, and fluorophosphate glasses; as well as $Pr^{3+}$-doped fluoroberyllate glasses. Organic glasses are also known in the art.

Other suitable materials are disclosed in, for example, U.S. Pat. Nos. 4,670,854 and 4,459,682, as well as in Macfarlane, "Photon-echo Measurements on the Trivalent Thulium Ion," *Optics Lett.* 18:1958–1960 (1993); Winnacker et al., "Photon-gated Hole Burning: A New Mechanism Using Two-step Photoionization," *Optics Lett.* 10:350–352 (1985); and Macfarlane, "Spectral Hole Burning in the Trivalent Thulium Ion," *Optics Lett.* 18:829–831 (1993). (Because each of these references is pertinent to an understanding of the present invention, each reference is expressly incorporated herein by reference.)

A 3-D optical grating can be, for example, an absorptive grating or a grating based upon variations in the index of refraction throughout the active material. Index-of-refraction gratings are not dependent upon actual absorption of light by the gradient. In order to form a suitable absorptive gradient in an active material, it is preferred that the material exhibit an absorption to the primary wavelength of electromagnetic radiation to be employed of about 50% (specifically, 1/e).

Materials suitable for forming surficial gradients can be any of various materials capable of physically supporting a surficial frequency-selective gradient. Since such materials need not be intrinsically frequency-selective, a wide variety of materials can be used. Generally, such materials are rigid and have a surface that is reflective to the wavelengths of light to be employed. (Reflectivity can be inherent or can result from an extraneously applied "silvering.") Alternatively, the surficial grating can be in the form of index-of-refraction variations on the surface. Specifically, any of various materials that are known in the art for making surficial holograms can be used.

7. Representative Applications

According to the present invention, apparatus and methods have been disclosed by which temporally encoded optical signals can be temporally processed and spatially routed by a programmed active material. Requisite spectral storage capacity may be provided by a response to programming of an intrinsically frequency-selective active material or via spatial interferometry involving a frequency non-selective active material. The flexability of the optical router to accept phase-, amplitude-, and frequency- encoded addresses enables a variety of implementation options. The high bandwidth capabilities of the optical router (i.e., tens to thousands of gigahertz) permits its use with the full bandwidth capabilities of fiber optics.

The following specific applications are disclosed, which are not intended to be limiting in any way:

(a) As an optical data router, for example, input bits, each encoded with a temporal address code, are passively directed into a destination direction and simultaneously stripped of their temporal encoding pattern.

(b) Any of various switching applications of information propagated using optical fiber technology are immediately apparent. E.g., the optical router can accept information from a single source fiber and route selected portions of the information to any of various preselected output directions as required, for example, in switching of telephone-transmitted information.

(c) The optical router is not limited to use with optical fiber data conduits. The router can also accept and re-direct information in free space.

(d) The optical router can accept information entering via a data beam and convert the information to a form that can be recognized by downstream equipment.

(e) The optical router can accept an information-containing input having a very high bandwidth that is normally not processable by equipment located downstream, and provide outputs having modified temporal profiles that downstream electronics can process. For example, an input stream containing an unmanageable amount of data can be converted by the optical router into portions having narrower bandwidth, each portion being directed in a different direction and providing a manageable amount of data (not merely a single bit) in each direction.

8. Representative Alternative Embodiments

The following alternative embodiments, in addition to other embodiments disclosed above, are provided as being exemplary only and are not intended to be in any way limiting.

Although temporally modulated beams can be formed either by direct modulation of a laser or by externally modulating an optical beam produced by a laser, external modulation is used in the embodiments described below.

Figure 5:
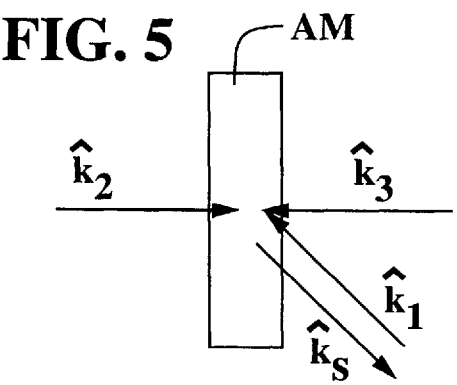
FIG. 5 schematically illustrates the relative orientation of first and second programming beams ($\hat{k}_1$ and $\hat{k}_2$), the data beam ($\hat{k}_3$) and the output, or signal, beam ($\hat{k}_5$) employed in several alternative embodiments of the present invention disclosed herein.

Unit vectors applicable to the following embodiments are shown in FIG. 5, wherein $\hat{k}_1$–$\hat{k}_3$ selectively provide input (programming and/or data) to the active material AM, and k. represents an output pulse. As can be seen, $\hat{k}_2$ and $\hat{k}_3$ are counter-propagating, which results in the output pulse $\hat{k}_s$ being in a direction opposite the first programming pulse $\hat{k}_1$. (Alternatively, it is also possible for $\hat{k}_1$ and $\hat{k}_3$ to be co-propagating, in which case $\hat{k}_s$ would be parallel to $\hat{k}_2$.)

Figure 6A:
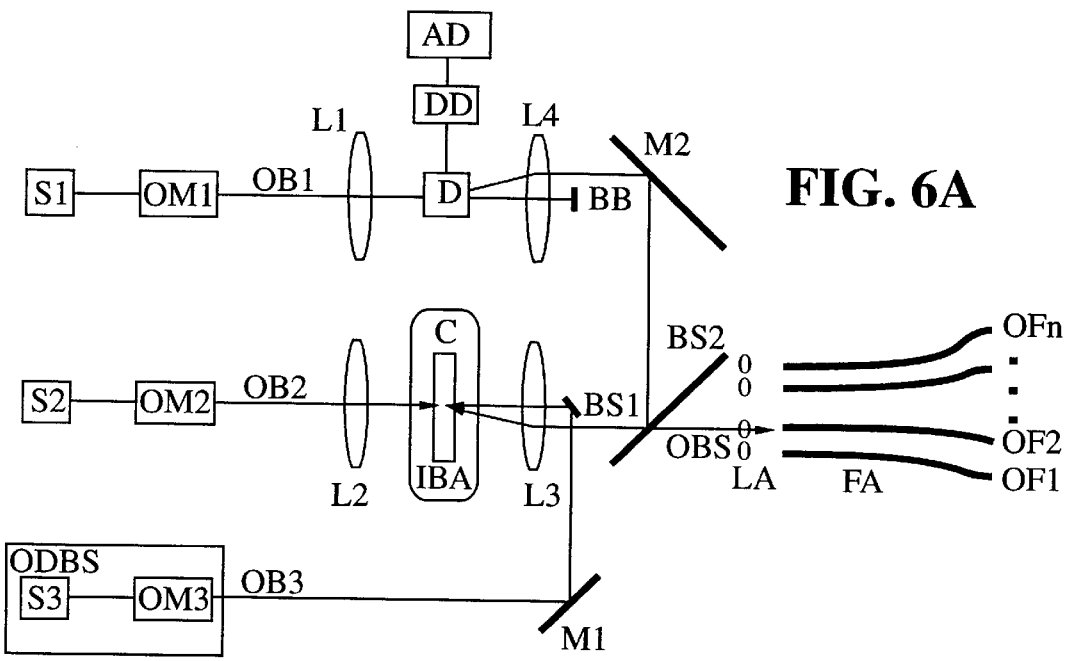
FIG. 6A schematically illustrates the optical configuration of several representative alternative embodiments of an optical router according to the present invention, the router being optically coupled to components suitable for free-space conduction of address, direction, and data input pulses to the active material, and for fiber-optic conduction of output pulses from the active material.
Figure 6B:
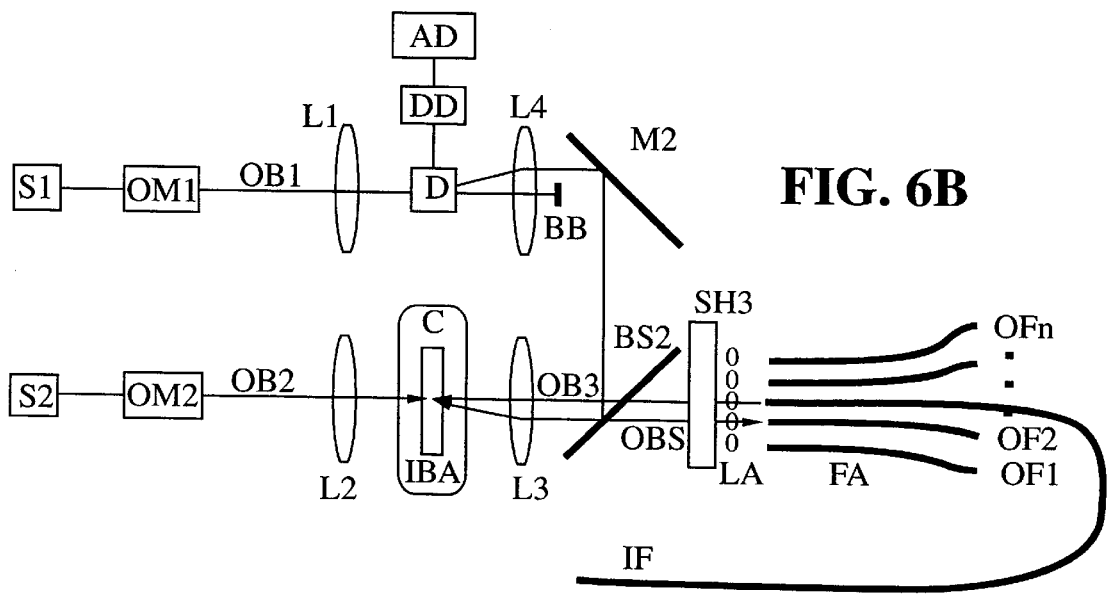
FIG. 6B schematically illustrates a variation of the FIG. 6A embodiment wherein, in FIG. 6B, an optical fiber is used to conduct input pulses to the active material.

A first representative embodiment is depicted in FIGS. 6A and 6B, including the active material IBA (inhomogeneously broadened absorber) on which a first pulse OB1, a second pulse OB2, and a third pulse OB3 impinge. (OB1, OB2, and OB3 correspond to $\hat{k}_1$, $\hat{k}_2$ and $\hat{k}_3$ respectively, in FIG. 5.)

The active material is maintained at a cryogenic temperature using a cooling means C such as a cryostat.

In the FIGS. 6A–6B embodiment, the desired data-routing destination is predetermined prior to arrival of the data at the IBA. The OB1 pulse provides the requisite direction pulse. Light comprising the pulse OB1 is produced by a source S1 and modulated using an optical modulator OM1. The pulse OB1 then passes through a lens L1, an x-y deflector D, and a lens L4. The pulse OB1 is reflected from a mirror M2 and then from a beam splitter BS2, then passed through the lens L3 to the IBA. The x-y deflector D can be an acoustic-optic or electro-optic device or any analogous device known in the art that imparts a temporal waveform to an optical beam. The address decoder AD interprets the desired routing address and determines the necessary corresponding x and y angular Deflections. The x and y coordinates are conducted to the deflector driver DD operably coupled to the x-y deflector D. Any extraneous outputs from the x-y deflector are passed to a beam blocker BB.

The beam OB2 provides data input to the IBA, as well as an address waveform. Upon entering the IBA, information encoded in the beam OB2 is "stored" until the IBA receives a "send" pulse. Light comprising the beam OB2 is produced by a source S2 and propagated through free space as shown in FIG. 6A. The beam OB2 is modulated using an optical modulator OM2. Continuing further with FIG. 6A, the beam OB2 is then deflected by a mirror M1, then by a beam splitter BS1, and passed through a lens L3 so as to impinge upon the IBA.

The data-containing OB2 can be generated remotely and transmitted to the IBA via an optical fiber (not shown), rather than using free-space optics as shown in FIG. 6A.

The third "input" pulse OB3 supplies a "send" pulse (comprising an address waveform). The pulse OB3 is produced by a source S3 and modulated using an optical modulator OM3. The input pulse OB3 is passed through a lens L2 so as to impinge on the active material IBA in a direction counter-current to the address pulse OB2.

Upon receiving the "send" pulse, the IBA releases a corresponding signal pulse OBS. The signal pulse OBS passes through the lens L3 and the beam splitter BS2. As the signal pulse OBS exits the IBA, its propagation direction is opposite that of the pulse OB1 that provided routing information to the IBA. The signal pulse OBS is emitted following the send pulse OB3 after a temporal delay substantially equal to any delay between the input pulse OB1 and the start of the data on beam OB2.

As shown in FIG. 6A, the signal pulse OBS can be directed into any of various optical "output" fibers OF1–OFn in a fiber array FA for conduction to downstream equipment (not shown). A corresponding lenslet array LA is provided to facilitate passage of light into the fibers.

The intensities of the input pulse OB2 and the input pulse OB1 at their smallest "spot" size in the IBA preferably do not saturate the resonant optical transition within any frequency interval of the IBA. An exception is whenever the input pulse OBI is very brief, in which instance the most efficient signal pulse may be obtained when the input pulse OB1 has an intensity yielding a $\pi/2$ pulse.

The durations of the pulses OB1 and OB2 are preferably less than the homogeneous lifetime of the active material IBA. The bandwidths of the pulses OB1–OB3 are preferably less than the inhomogeneous bandwidth of the IBA so as to allow the pulse OB2 to faithfully be "recorded" in the IBA and to allow the orthogonal temporal coding used for the pulses OB1 and OB3 to remain orthogonal.

The allowable delay between the pulses OB2 and OB3 depends on the lifetime of the spectral population gratings produced in the IBA. The signal intensity of the signal pulse OBS is proportional to the square of the amplitude of the gratings in the IBA. If the delay is equal to or greater than the lifetime of the grating, the signal pulse OBS will be attenuated.

In this embodiment, the temporal structures of the pulses OB1 and OB3 preferably each have a sharp auto-correlation peak with a width less than the shortest temporal feature of the data encoded on pulse OB2. Brief pulses would be valid for pulses OB1 and OB3. More complex pulses can also be used. If the temporal shape of pulse OB1 were one of an orthogonal set of temporally coded pulses, then the IBA only would generate a signal pulse in the desired routing direction if the pulses OB1 and OB3 were the same. This can be used to allow multiple data pulses to be recorded sequentially in the IBA and recalled therefrom on demand. Such a feature could be used to delay the transmission of certain data from the IBA whenever the data may be obstructed by other data being transmitted or if data transmission must be delayed due to other bottlenecks.

A second representative embodiment is also shown in FIG. 6A. In this embodiment, an address code is convolved with the temporal waveform of the data. The active material IBA, which is programmed before the data enters it, acts as a passive router.

Programming of the active material IBA is performed as follows: The IBA is first illuminated by an input pulse OB1 that contains a temporally encoded address code. The pulse OB1 is generated by modulating the output of the laser source S1 using the optical modulator OM1. The pulse OB1 is angularly deflected by the x-y deflector D according to predetermined x and y coordinates associated with the address code. The direction pulse OB1 is reflected by the mirror M2 and the beam splitter BS2 and impinges the IBA from a direction opposite the desired signal output direction. I.e., the input pulse OB1 and the signal pulse OBS counter-propagate.

The duration of the pulse OB1 is less than the homogeneous relaxation time of the IBA. After the end of the pulse OB1, the IBA receives a brief reference pulse OB2 generated by modulating the output of the source S2 using the optical modulator OM2. This completes the programming of the active material for one address code.

Other address codes corresponding to different routing directions can be programmed into the IBA by repeating the foregoing programming process. For example, to program a second address code, the optical modulator OM1 temporally encodes the second address code onto the pulse OB1. The address decoder AD determines the appropriate x-y angles for the second address code to facilitate routing of data in the second routing direction. The deflector D correspondingly directs the newly coded pulse OB1 to arrive at the IBA in a direction corresponding to the second address code (but different from the direction encoded in the first address code).

As described, each possible routing direction has an associated address code. Multiple address codes can include the same or different routing directions. For example, certain applications may require that multiple data destinations have a common intermediate path. Alternatively, multiple routing directions can have the same address code, thereby permitting multicasting of data.

As shown in FIG. 6A, an input beam OB3 comprising data convolved with a desired address code can be generated remotely (by an optical data beam source ODBS comprising the source S3 and modulator OM3) and transmitted to the IBA by free-space optics. The beam OB3 is deflected by a mirror M1 and a beam splitter BS1 so as to impinge upon the IBA.

FIG. 6B shows an instance in which the input pulse OB3 is conducted to the IBA using an optical fiber IF rather than free-space optics. The optical fiber IF can be part of an array FA of optical fibers that includes fibers OF1–OFn useful for conducting signal pulses OBS.

The duration of the data-coded input beam OB3 is not limited by the homogeneous bandwidth of the IBA. The signal (output) pulse OBS is emitted from the IBA so long as the address code convolved in the data beam OB3 matches the address code contained in the pulse OB1. The routed signal beam OBS is delayed relative to the input beam OB3 by an interval about equal to the time between the center of the coded pulse OB1 and the reference pulse OB2.

The embodiment of FIGS. 6A–6B can also be configured to operate using a single address code contained in, e.g., a brief pulse. In such an instance, only one routing direction could be programmed at a time (except for purposes of multiple-casting of data). Such a configuration would operate as an indiscriminate router of optical data until reprogrammed.

The embodiments of FIGS. 6A–6B can be used in various functional combinations. For example, instead of serving simply as a directional router of optical data, a first optical router according to the present invention can be used as a "look-up table" that accepts an optical address code as an input and produces, as an output, an optical pulse that propagates to a second (i.e., downstream) optical router, according to the present invention, that then appropriately routes the data. Such a configuration is applicable to optical data networks in which directional addresses immediately precede corresponding data to be routed; the first optical router must interpret the address and then direct the second router to route the data in the appropriate direction.

As an alternative to an optical router being used to produce a single output (signal) pulse in response to an input address code, an optical router according to the present invention can be used to produce a set of selected output beams used to "set" one or more downstream optical routers used as optical switches. Alternatively, the outputs of an upstream optical router can be used to controllably "set" an optical router having multiple control inputs (for example, as controlled by a binary input). The upstream optical router would essentially accept a serial header and produce output pulses comprising appropriate parallel control settings.

According to yet another alternative, the output pulse of an optical router can have a temporal coding in addition to a directional coding. In, for example, the optical-router embodiment shown in FIG. 6A, this is accomplished by replacing the reference pulse OB2 with a coded reference pulse that is modulated with a desired temporal output waveform associated with a particular pulse OB1 providing directional information. Whenever the optical router is illuminated by an address header in the data beam OB3 that matches the pulse OB1, an output pulse OBS having the same temporal shape as the reference pulse OB2 is produced by the active material IBA. The temporal information in the output pulse OBS can then be used to "set" a downstream optical router used as an optical switch. This allows each output of the router to handle multiple address codes.

While the invention has been described in connection with multiple possible embodiments, it will be understood that it is not limited to those embodiments. On the contrary, it is intended to cover all alternatives, modifications, and equivalents as may be included within the spirit and scope of the invention as defined by the appended claims.

What is claimed is:

1. A composite grating, comprising:

(a) an active material; and (b) an ordered assemblage of subgratings supported by the active material, wherein (i) each subgrating controls diffraction of a subbandwidth of light from one of a set of prescribed input paths into one of a set of prescribed output paths, the input paths of the set of prescribed input paths intersecting with the output paths of the set of prescribed output paths at or in the composite grating, (ii) each of the subgratings is configured such that (1) a first input optical pulse, interacting with the active material along a first one of the set of prescribed input paths and having a first prescribed input temporal waveform, triggers one or more first output optical pulses having first prescribed output temporal waveforms and propagating along one or more of the set of prescribed output paths, and (2) a second input optical pulse, interacting with the active material along a given second one of the set of prescribed input paths and having a second prescribed temporal waveform, triggers one or more second output optical pulses having second prescribed output temporal waveforms and propagating along one or more of the set of prescribed output paths, the first input pulse differing from the second input pulse in at least one of temporal waveform and input path travelled, the first output pulses differing from the second output pulses in at least one of temporal waveform or waveforms and output path or paths travelled, and the first input pulse differing from at least one of the first output pulses in temporal waveform.

2. The composite grating of claim 1, wherein the set of prescribed input paths consists of one input path.

3. The composite grating of claim 2, wherein the output pulses are substantially temporally brief pulses.

4. The composite grating of claim 1, wherein the set of prescribed output paths consists of one output path.

5. The composite grating of claim 4, wherein the first and second prescribed input temporal waveforms are the same.

6. The composite grating of claim 5, wherein the first and second prescribed input temporal waveforms are temporally brief pulses.

7. The composite grating of claim 1, wherein the subgratings are Volume gratings defined within an active material that is intrinsically frequency-selective.

8. The composite grating of claim 1, wherein the subgratings are surface gratings defined on an active material that is intrinsically frequency-selective.

9. The composite grating of claim 1, wherein the subgratings are volume gratings defined within an active material having essentially no intrinsic frequency selectivity.

10. The composite grating of claim 1, wherein the subgratings are surface gratings on an active material having essentially no intrinsic frequency selectivity.

11. The composite grating of claim 1, wherein the subgratings are index-of-refraction gratings.

12. The composite grating of claim 1, wherein the subgratings are reflective gratings.

13. The composite grating of claim 1, wherein the subgratings are absorptive gratings.

* * * * *